(12) United States Patent
Flynn et al.

(10) Patent No.: US 8,332,424 B2
(45) Date of Patent: Dec. 11, 2012

(54) METHOD AND APPARATUS FOR ENABLING VIRTUAL TAGS

(75) Inventors: John Flynn, Marina del Rey, CA (US); Dragomir Anguelov, Mountain View, CA (US); Hartmut Neven, Malibu, CA (US); Mark Cummins, Santa Monica, CA (US); James Philbin, Santa Monica, CA (US); Rafael Spring, Santa Monica, CA (US); Hartwig Adam, Marina del Rey, CA (US); Anand Pillai, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 34 days.

(21) Appl. No.: 13/107,295

(22) Filed: May 13, 2011

(65) Prior Publication Data

US 2012/0290591 A1 Nov. 15, 2012

(51) Int. Cl.
*G06F 17/30* (2006.01)

(52) U.S. Cl. ......... 707/769; 707/809; 707/915; 709/203

(58) Field of Classification Search .................. 707/769, 707/809, 915, 999.201; 705/301; 709/203; 455/557
See application file for complete search history.

(56) References Cited

U.S. PATENT DOCUMENTS

| | | | |
|---|---|---|---|
| 6,377,793 B1 | 4/2002 | Jenkins | |
| 6,480,713 B2 | 11/2002 | Jenkins | |
| 6,681,107 B2 | 1/2004 | Jenkins et al. | |
| 6,690,516 B2 | 2/2004 | Aritake et al. | |
| 6,763,148 B1 | 7/2004 | Sternberg et al. | |
| 7,340,214 B1* | 3/2008 | Hamberg | 455/41.2 |
| 7,363,024 B2 | 4/2008 | Jenkins | |
| 7,565,139 B2* | 7/2009 | Neven et al. | 455/414.3 |
| 7,885,635 B2* | 2/2011 | Laursen et al. | 455/403 |
| 7,936,484 B2* | 5/2011 | Roncal | 358/402 |
| 8,005,507 B2* | 8/2011 | Celik | 455/557 |
| 8,098,894 B2* | 1/2012 | Soderstrom | 382/104 |
| 8,107,921 B2* | 1/2012 | Fiatal | 455/405 |
| 8,190,733 B1* | 5/2012 | Hoffman et al. | 709/224 |
| 2006/0253491 A1 | 11/2006 | Gokturk et al. | |
| 2007/0047816 A1 | 3/2007 | Graham et al. | |

(Continued)

OTHER PUBLICATIONS

Dan R. Herrick, "Google This! Using Google Apps for Collaboration and Productivity", ACM SIGUCCS'09, Oct. 11-14, 2009, pp. 55-63.*

(Continued)

*Primary Examiner* — Cheryl Lewis
(74) *Attorney, Agent, or Firm* — Blakely, Sokoloff, Taylor & Zafman LLP

(57) ABSTRACT

A method and apparatus for enabling virtual tags is described. The method may include receiving a first digital image data and virtual tag data to be associated with a real-world object in the first digital image data, wherein the first digital image data is captured by a first mobile device, and the virtual tag data includes metadata received from a user of the first mobile device. The method may also include generating a first digital signature from the first digital image data that describes the real-world object, and in response to the generation, inserting in substantially real-time the first digital signature into a searchable index of digital images. The method may also include storing, in a tag database, the virtual tag data and an association between the virtual tag data and the first digital signature inserted into the index of digital images.

15 Claims, 13 Drawing Sheets

U.S. PATENT DOCUMENTS

| | | |
|---|---|---|
| 2007/0096909 A1 | 5/2007 | Lally |
| 2007/0250901 A1 | 10/2007 | McIntire et al. |
| 2008/0167004 A1 | 7/2008 | Jenkins |
| 2008/0285940 A1 | 11/2008 | Kulas |
| 2009/0003662 A1 | 1/2009 | Joseph et al. |
| 2009/0006937 A1 | 1/2009 | Knapp et al. |
| 2009/0094520 A1 | 4/2009 | Kulas |
| 2009/0102859 A1 | 4/2009 | Athsani et al. |
| 2009/0165140 A1 | 6/2009 | Robinson et al. |
| 2009/0182644 A1 | 7/2009 | Panagopulos et al. |
| 2009/0287990 A1 | 11/2009 | Lynton et al. |
| 2010/0103075 A1 | 4/2010 | Kalaboukis et al. |
| 2010/0278439 A1 | 11/2010 | Lennington et al. |
| 2010/0318507 A1 | 12/2010 | Grant et al. |
| 2011/0085041 A1 | 4/2011 | Kildevaeld |
| 2011/0213664 A1 | 9/2011 | Osterhout et al. |

OTHER PUBLICATIONS

Vinod Namboodiri, "Towards Sustainability in Portable Computing through Cloud Computing and Cognitive Radios", IEEE 2010, 2010 39th International Conference on Parallel Processing Workshops, pp. 468-475.*

PCT/US2012/35284; International Search Report and Written Opinion, mailed Jul. 24, 2012, 9 pages.

Nagao, Katashi, et al, "Ubiquitous Talker: Spoken Language Interaction with Real World Objects," Technical Report SCSL-TR-95-003, Sony Computer Science Laboratory Inc., Tokyo, Japan, 1995, 11 pages.

Rekimoto, Jun, "Augmented Interaction: The World Through the Computer," <http://ftp.csl.sony.co.jp/person/rekimoto/navi.html>, 1995, 2 pages.

Rekimoto, Jun, "Augmented Interaction: Toward a New Human-Computer Interaction Style Based on Situation Awareness," Interactive Systems and Software II (WISS'94 Proceedings), 1994 (in Japanese), 10 pages.

Rekimoto, Jun, "The Magnifying Glass Approach to Augmented Reality Systems," International Conference on Artificial Reality and Tele-Existence 1995 / Conference on Virtual Reality Software and Technology (ICAT/VRST 1995), 10 pages.

Rekimoto, Jun, et al, "The World through the Computer: Computer Augmented Interaction with Real World Environments," User Interface Software and Technology (UIST 1995), 8 pages.

Sung, Dan, "Augmented reality in action—social networking," <http://m.pocket-lint.com/news/news.phtml/38918>, Mar. 4, 2011, 7 pages.

Screen Capture of a YouTube Video, "N'importe Comment—The Toxic Avenger Feat Orelsan," <http://www.youtube.com/watch?v=XAOwo6uuhok>, accessed May 10, 2011, 1 page.

* cited by examiner

METHOD AND APPARATUS FOR ENABLING VIRTUAL TAGS

TECHNICAL FIELD

Embodiments of the invention relate to the field of augmenting digital images and videos, and more particularly, to enabling the virtual tagging of real-world objects.

BACKGROUND

The Internet provides a vast amount of knowledge about people, places, and things. Users utilize search engines to cull through the vast array of available knowledge when they want detailed information about a particular person, place, or thing. Mobile devices may be utilized to access the Internet and conduct searches from anywhere. For example, when a user is standing next to a historical landmark, he or she may search historical data for the landmark, photos relevant to the landmark, etc. A search engine returns results to the user based on the query by locating relevant content that was found by the search engine via a web crawl.

The information available on the Internet was made more personal and socially interactive with the advent of social networking. With social networking, users are able to share chat sessions with each other, post comments to each other, share pictures, etc. However, the interaction between users in a social networking environment is generally limited to the specially created web interface of the social networking system.

SUMMARY

A method and apparatus for enabling virtual tags is described. According to an exemplary method, a first digital image data and virtual tag data to be associated with a real-world object in the first digital image data is received. In one embodiment, the first digital image data is captured by a first mobile device and the virtual tag data includes metadata received from a user of the first mobile device. In one embodiment, a first digital signature is generated from the first digital image data that describes the real-world object, and inserted in substantially real-time into a searchable index of digital images in response to the extraction. In one embodiment, the virtual tag data and an association between the virtual tag data are stored in a tag database, and the first digital signature inserted into the index of digital images.

In one embodiment, the exemplary method also includes receiving a second signature generated from a second digital image data captured by a second mobile device, the second digital image data includes one or more real-world objects. In one embodiment, the virtual tag data, received from the user of the first mobile device and associated with the real-world object in the first digital image data, is transmitted to the second mobile device when a search of the index of digital images based on the second digital signature results in a match with the first digital signature.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
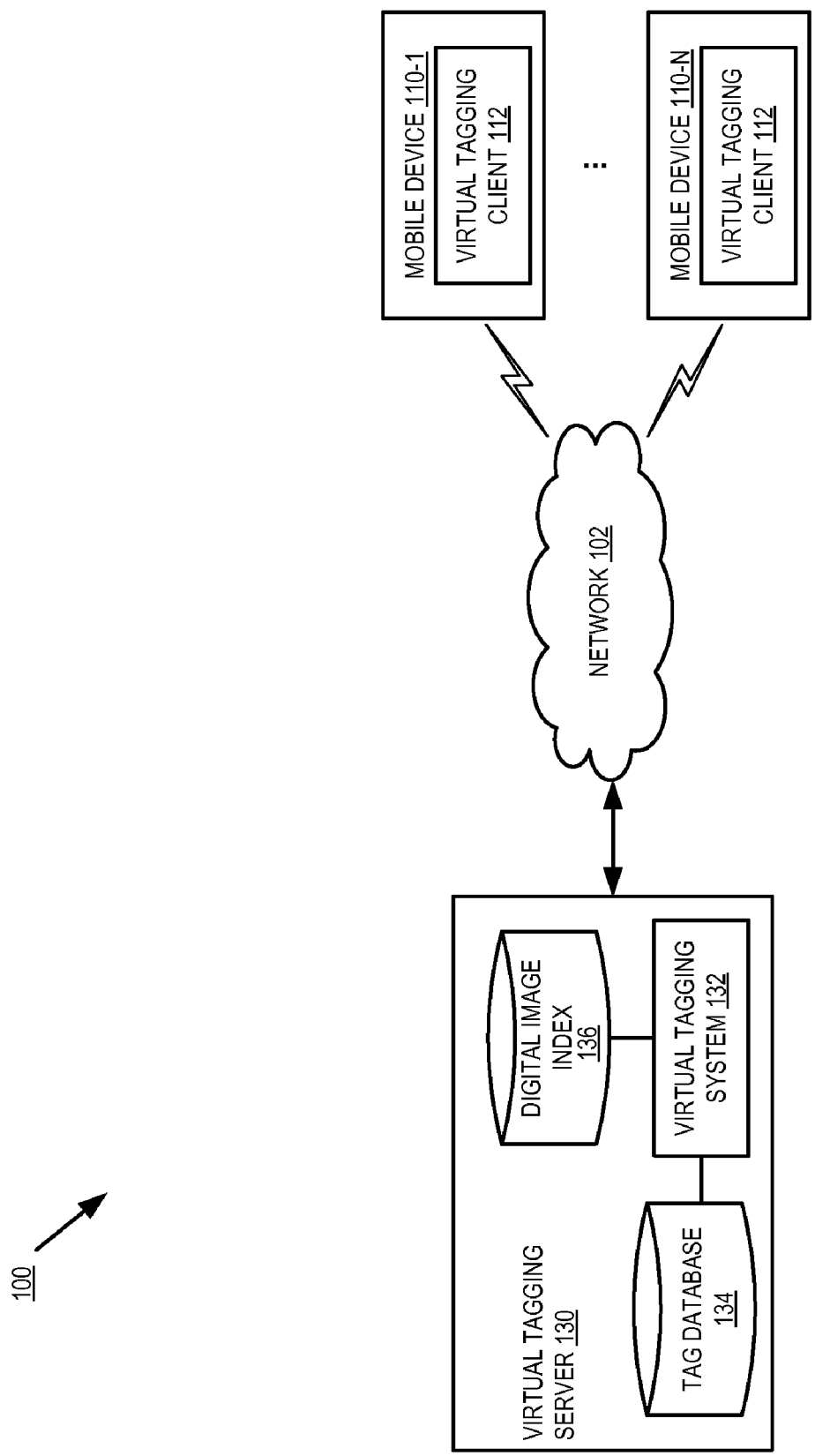
FIG. 1 is a block diagram of exemplary system architecture for enabling virtual tags.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "generating", "inserting", "storing", "selecting", "transmitting", "querying", "obtaining", "filtering", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of exemplary system architecture 100 for enabling virtual tags. In one embodiment, the system 100 includes a plurality of mobile devices, such as mobile device 110-1 to mobile device 110-N, and a virtual tagging server 130. In one embodiment, mobile device 110 may be a mobile computing device, such as a mobile telephone, personal digital assistant, tablet computer, wearable computing device, etc. The virtual tagging server 130 may also be a computing device, such as a server computer, desktop computer, etc.

The mobile devices 110 and virtual tagging server 130 may be coupled to a network 102 that communicates any of the standard protocols for the exchange of information. In one embodiment, mobile devices 110 are coupled with network 102 via a wireless connection, such as a cellular telephone connection, wireless fidelity connection, etc. The mobile devices 110 and virtual tagging server 130 may run on one Local Area Network (LAN) and may be incorporated into the same physical or logical system, or different physical or logical systems. Alternatively, the mobile devices 110 and virtual tagging server 130 may reside on different LANs, wide area networks, cellular telephone networks, etc. that may be coupled together via the Internet but separated by firewalls, routers, and/or other network devices. In yet another configuration, the virtual tagging server 130 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

The mobile devices 110 are responsible for capturing digital images of real-world objects with a digital camera (not shown) of the mobile device. A real-world object may be a person, place, or thing. In one embodiment, the digital images of the real-world objects may include still photographs, digital video, a sequence of digital photographs, a live video feed, etc. In one embodiment, when a mobile device, such as mobile device 110-1, captures a digital image, the virtual tagging client 112 of the mobile device may additionally tag an object within the digital image.

In one embodiment, a tag is user-created content that includes one or more of an icon, image, metadata (e.g., user supplied comments about the object), web links, geographic location, etc. that are to be associated with the digital image. In one embodiment, virtual tagging client 112 provides a user interface to a user of the mobile device 110 for authoring tag data. For example, virtual tagging client 112 may provide an alphanumeric input to enable a user to enter comments about a real-world object within a digital image, a set of icons that the user may select to be displayed over the digital image, an interface to enter a web link to a website related to the real-world object, embedded audio or video clips, textual messages, etc. Tags and the exemplary types of tags are discussed in greater detail below.

In one embodiment, mobile device 110-1 transmits the captured image and the associated tag data to virtual tagging server 130. In one embodiment, mobile device 110, such as a cellular telephone or a cellular communication enabled wearable device, transmits the digital image and the corresponding tag data to the virtual tagging server 130.

The virtual tagging server 130 is responsible for receiving the digital image and associated tag data. In one embodiment, virtual tagging system 132 of virtual tagging server 130 then indexes the image of the real-world object in real time as the digital image is received by the virtual tagging system 132. As will be discussed in greater detail below, virtual tagging system 132 performs one or more image recognition processes on the digital image to create a digital signature for the real-world object within the digital image. This digital signature is then added in real-time to an index of other image signatures in a database 136 of searchable images maintained by the virtual tagging server 130. Furthermore, when virtual tagging system 132 indexes the image of the real-world object, virtual tagging system 132 stores the corresponding tag data in a tag database 134 and associates the tag data with the real-world object in the indexed image. Virtual tagging system 132 may further send mobile device 110-1 a confirmation that the image was successfully indexed in order to inform the user of mobile device 110-1 that the image has been successfully indexed and tag data stored. Although virtual tagging system 132 has been described as generating a digital signature for a real-world object in an image, in one embodiment, virtual tagging client 112 may create the digital signature, and transmit the signature and tag data to the sever 130. In yet another embodiment, both the virtual tagging client 112 and virtual tagging system 132 create digital signatures for images of real-world objects.

In one embodiment, virtual tagging system 132 of virtual tagging server 130 indexes the digital image of the real-world object when the real-world object is not already found within the searchable digital image index 234. That is, when an image of a real-world object has already been indexed by virtual tagging system 132, the virtual tagging system 132 does not create a new index for the real world object. Rather, virtual tagging system 132 adds the tag data to tag database 134 and associates the new tag data with the pre-existing index entry in the digital image index 234. Furthermore, this tag data may be added to, or supplement, tag data that is already stored in tag database 134 and associated with the real-world object.

In one embodiment, however, virtual tagging system 132 may index different digital images of the same real-world object in the searchable digital image index 234. When different digital images of the same real-world object are indexed, matching a new image of the real-world object may be improved because there are more potential sources in the searchable digital image index 234 for finding a successful match. In one embodiment, virtual tagging system 132 associates the tag data for a real-world object in the tag database 134 with each of the indexed images of the real-world object. A match against any one of the indexed images of the real-world object is therefore linked to the tag data for the real-world object.

Virtual tagging server 130 is also responsible for receiving digital images from other mobile devices, such as mobile device 110-N. In one embodiment, mobile device 110-N may be capturing an image to upload to virtual tagging server 130, capturing video of real world objects (e.g., recording video on a cellular telephone, capturing live video with a wearable computing device, etc.), etc. In one embodiment, virtual tagging system 132 computes a digital signature for objects within the digital image or video, and searches the digital image index 136 for a match. When virtual tagging system 132 locates a match, thereby indicating that a real-world object has previously been indexed by virtual tagging system 132, virtual tagging system 132 obtains tag data from tag database 134 associated with the real-world object. In one embodiment, virtual tagging system 132 provides the tag data to the virtual tagging client 112 of mobile device 110-N.

Figure 12:
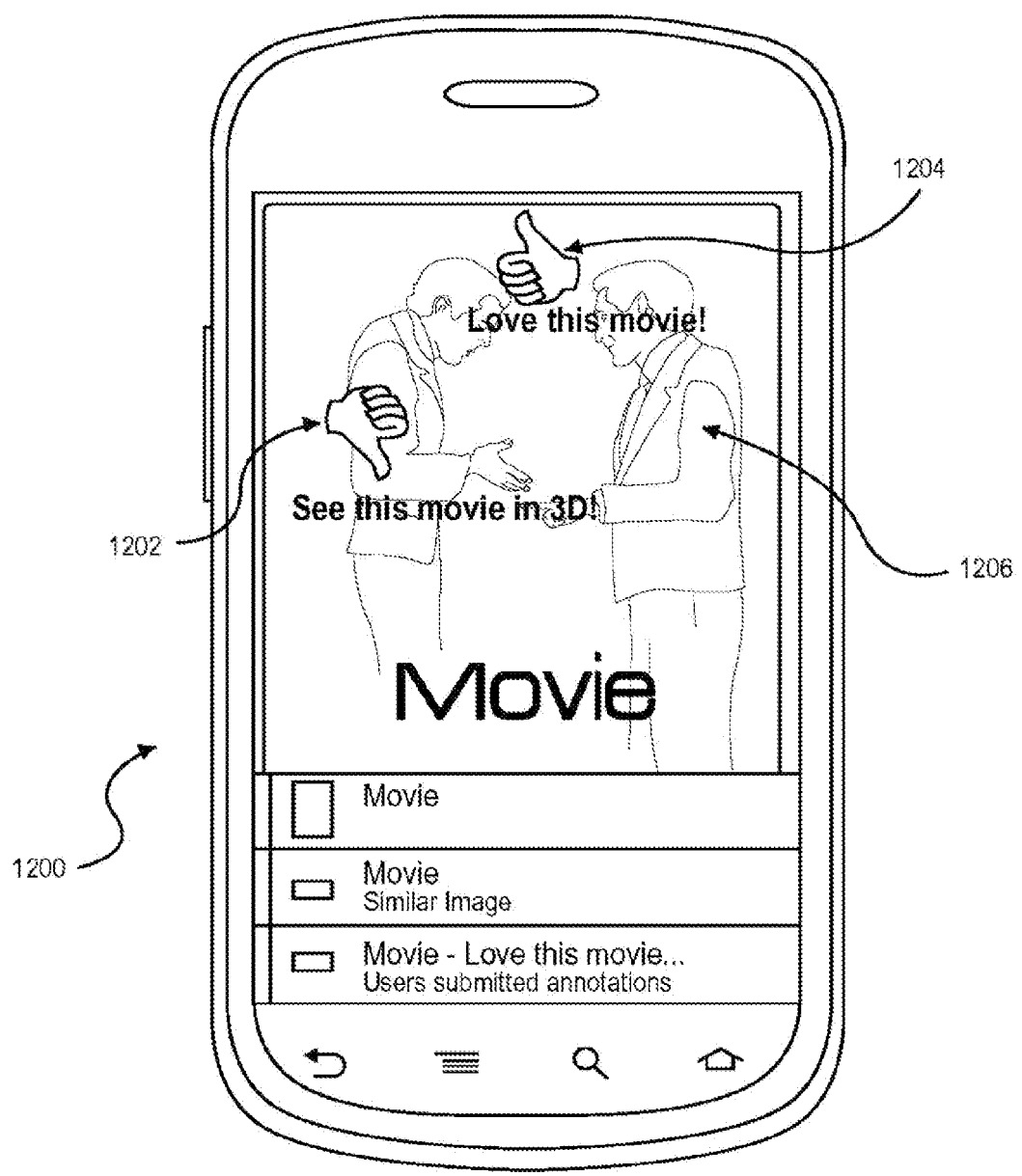
FIG. 12 illustrates an example display of a digital image with virtual tags.

In one embodiment, when virtual tagging client 112 of mobile device 110-N receives the tag data, virtual tagging client 112 renders the tag data over the digital image displayed on mobile device 110-N. For example, as illustrated in FIG. 12, virtual tagging client 112 may render an image of a movie theater poster 1206 with thumbs-up images 1204 and thumbs-down images 1202 rendered over the movie theatre poster image 1206 indicating that previous users who have tagged the image love the movie or hate the movie. As discussed herein, the tags may include various forms of user-created content, such as comments posted by other users, tag icons selected by other users, digital photographs or videos captured by other users to be displayed with the real-world object, etc. As will be discussed below in greater detail, there are various types of tags, as well as ways virtual tagging system 132 limits which tags are displayed over images captured by a mobile device 110.

Another example that illustrates the interaction between the virtual tagging client 112 and the virtual tagging system 132 is provided below. In the example, and with reference to FIG. 13, a digital image of street art 1302 is captured by a user of mobile device 110-1. In this example, the user is the artist and the digital image is of real-world graffiti that the artist has just created. In one embodiment, virtual tagging client 112 enables the artist to create one or more tags 1358 to be associated with the street art 1302. The tags might include the artist's comment 1358 "How do you like my art???" and/or a link to the artist's web page. Virtual tagging system 132 would receive the digital image and the tag data, and generate a digital signature for the piece of street art. Because the street art was newly created by the artist just moments ago, virtual tagging system 132 will not find a corresponding entry in the digital image index 136. Virtual tagging system 132 then adds the digital signature to the digital image index 136 in real time, and adds the corresponding tag data to the tag database 134. Because the image of the street art has been indexed in real-time, other users, such as a user of mobile device 110-N capturing video of the street art, may instantly receive tag data at virtual tagging client 112. Alternatively, a user may receive notice (e.g., a phone vibrating, an audio chime, etc.) that tags are available for a real-world object within an image/video frame. This tag data 1356 and 1358 associated with the street art 1302 may then be rendered by the virtual tagging client 112 over the video being captured by mobile device 110-N in order to alert the user of mobile device 110-N that tag data for the real world object is available.

Figure 2:
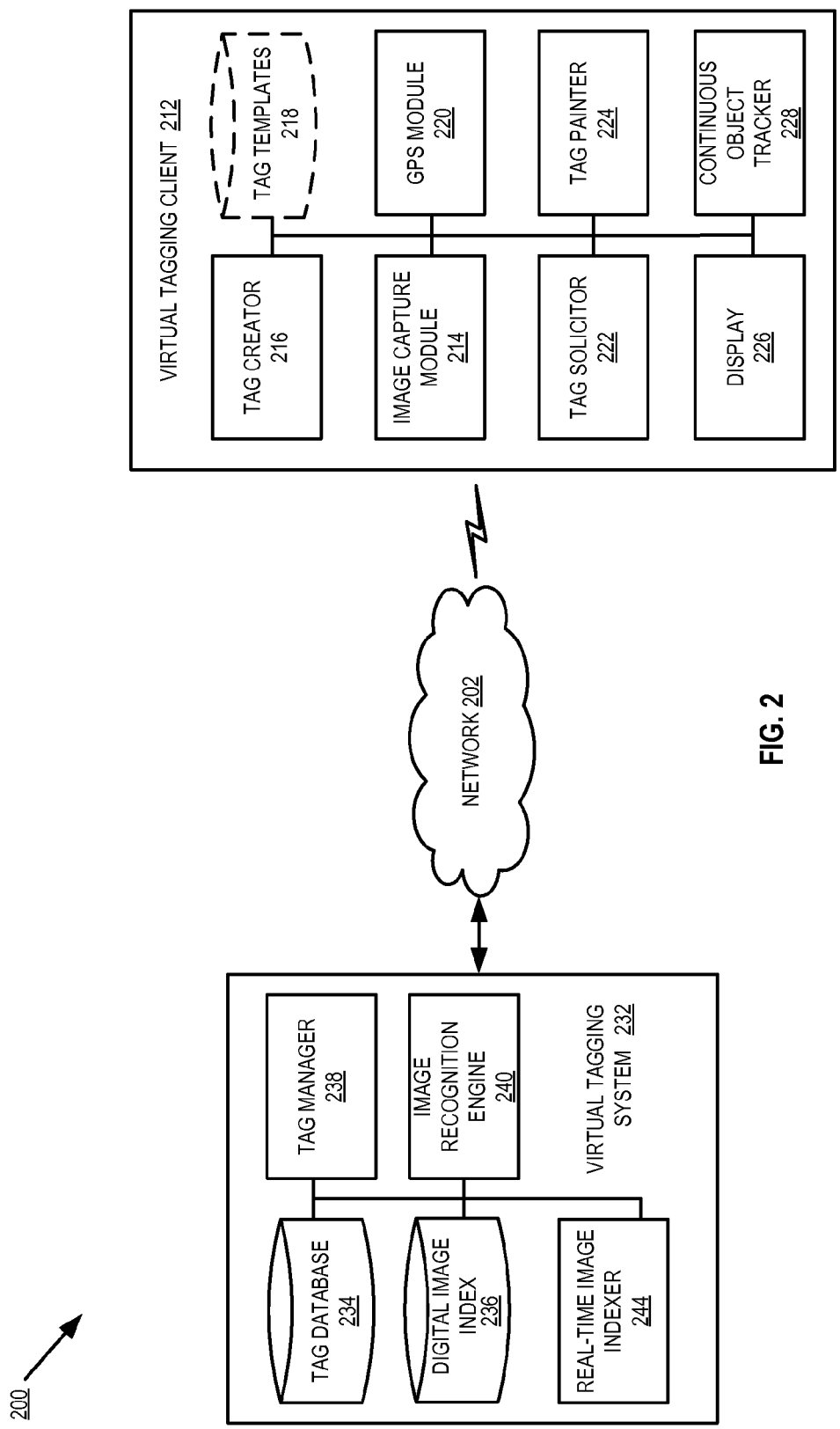
FIG. 2 is a block diagram of one embodiment of a virtual tagging system and a virtual tagging client.

FIG. 2 is a block diagram of one embodiment 200 of a virtual tagging system and a virtual tagging client. Virtual tagging client 212 and virtual tagging system 232 provide additional details for the virtual tagging clients 112 and virtual tagging system 132 discussed above in FIG. 1.

In one embodiment, virtual tagging client 212 may include an image capture module 214, a tag creator 216, a database of tag templates database 218, a tag solicitor 222, a tag painter 224, a continuous object tracker 228, a display 226, and a global positioning system (GPS) module 220. In one embodiment, virtual tagging system 232 may include an image recognition engine 240, a tag manager 238, a tag database 234, a digital image index 236, and a real-time image indexer 244. In one embodiment, the virtual tagging client 212 and virtual tagging system 232 communicate with each other over various networks and network configurations as discussed above in FIG. 1.

In the virtual tagging client 212, image capture module 214 is responsible for capturing digital images of real world objects. The digital images may include still digital photographs, a series of still digital photographs, a recorded video, a live video feed, etc. In one embodiment, image capture module 214 is a digital camera of a mobile device.

In one embodiment, in response to a digital image being captured by image capture module 214, tag creator 216 enables a user to author a tag for an object within the digital image. In one embodiment, tag creator 216 generates a graphical user interface on display 226 that may include user interface elements for entering comments, selecting other digital images to be provided as a tag, entering a review of the real-world object, entering web links, including GPS data captured by the GPS module 220, etc. In one embodiment, tag creator 214 further enables a user to author a tag for a limited audience. In one embodiment, tag creator 214 enables a user to specify one or more additional users who will be able to view the virtual tag. For example, a user may specify that only friends in a social networking group, only members with a specific group membership, etc. may view the authored virtual tag.

In one embodiment, tag creator 216 may further provide a user with access to a database of tag templates 218. In one embodiment, a tag template is a pre-created tag, such as an icon image, a pre-formatted comment field, a social networking post, a web link, a virtual sticker, etc. For example, a set of tag templates may be for virtual stickers that are pre-created for placement over a real-world object. In the movie theater poster example discussed above and illustrated in FIG. 12, tag templates 218 may provide the thumbs-up icon 1204 and thumbs-down icon 1202 to enable a user to quickly tag a real-world object with like and dislike image tags. In one embodiment, tag creator accesses the tag templates 218 at the virtual tagging system. However, as indicated by the dashed lines, tag templates 218 may be located at the virtual tagging system 232 (not shown) or any other remote system, and tag creator 216 accesses the tag templates via network 202.

In one embodiment, and also in response to the digital image being captured by image capture module 214, tag solicitor 222 queries virtual tagging system 232 for the existence of any previously created tags that are associated with real world objects in the digital image. In one embodiment, in order to aid in detection of virtual tags, as well as to inform users where to direct image capture module 214, GPS module 220 may indicate when tags are located within a geographic area. In one embodiment, GPS module 220 may cause a mobile device running virtual tagging client 212 to vibrate, play audio, etc. Furthermore, GPS module 220 may display a virtual map with visual indicators of the location of nearby virtual tags.

In one embodiment, tag solicitor 222 transmits the digital image captured by image capture module 214, which may include a digital video, to image recognition engine 240. Image recognition engine 240 analyzes the digital image to generate one or more digital signatures for real-world objects within the digital image. As is discussed below, in one embodiment, image recognition engine 240 calculates a feature vector from pixels of the digital image, where values in the feature vector correspond to relevant pixels within the image. This feature vector then becomes a digital signature for a real-object within the digital image.

Image recognition engine 240 utilizes the digital signature to search a digital image index 236. Although the digital image index 236 is illustrated as a component of the virtual tagging system 232, the digital image index 236 may be maintained at a remote system (not shown). When image recognition engine 240 finds a match between the digital signature generated for the digital image, and a digital signature within digital image index 236, image recognition engine 240 informs tag manager 238.

In one embodiment, tag manager 238 utilizes the matched index for the digital image to query a tag database 234. In one embodiment, the tag database 234 may store tags previously created by users to be associated with the real-world object. In one embodiment, tag database 234 may store data that causes tag manager 238 to further obtain tag data from an external system. For example, tag database 234 may include data, such as a social network identity, passwords, current GPS location of the virtual tagging client 212, etc., that the tag manager 238 utilizes to obtain tag data from the remote source. In the example, tag manager 238 can then utilize social networking identity, virtual group memberships, current location, etc. to either increase or limit which tags are returned. For example, social networking data may be obtained by the tag manager 238 to boost image matching results with tag data associated with social networking "friends." As another example, image matches that are geographically close to a user can be prioritized ahead of other results. Thus, tag data results for an image of a specific store, based on a virtual tagging client's 212 current location, can be shown ahead of tag data associated with far away stores of the same chain. In one embodiment, tag manager 238 returns the tag data to virtual tagging client 212. In one embodiment, tag manager 238 obtains tag data for users that have opted in to the virtual tagging system, after user consent to disclosure of user's rights and terms with respect to the virtual tagging services.

Tag solicitor 222 receives the tag data that is to be associated with a digital image captured by a mobile device. Tag solicitor 222 provides the tag data to tag painter 224. In one embodiment, tag painter 224 renders tag data onto a digital image that is currently being displayed in display 226. Because the location of a real-world object within a digital image may vary, and digital image data may be a digital video or live video feed, continuous object tracker 228 locates the real-world object within the digital image. Continuous object tracker 228 determines a set of coordinates, a bounding box, or some other location, of the real-world object within the digital image. Continuous object tracker 228 then provides this location data to tag painter 224, so that tag painter can render the tag data over the digital image at the appropriate location within the display 226.

Returning to virtual tagging system's 232 receipt of a digital image, when there is no record of a digital signature for a real-world object within digital image index 236, image recognition engine 240 provides the digital signature to real-time image indexer 244. Real-time image indexer 244 analyzes the digital signature and then inserts the digital signature within the existing digit image index 236. Because the digital signature is inserted directly into the digital image index 236, the index becomes immediately searchable by other virtual tagging clients (not shown) for images that contain the real-world object.

The receipt of the digital signature, which was not previously indexed by virtual tagging system 232, may also be accompanied by one or more virtual tags authored by the tag creator 216 of virtual tagging client 212. In one embodiment, tag manager 238 stores the tag data in tag database 234. Tag manager 238 further associates the stored tag data with the digital signature for the real-world object that was added to the digital image index 236 in real time. As a result, the other virtual tagging clients are not required to wait for a batch update to the digital image index 236 before images of the real-world object become searchable, and the tags associated with the real world object are made available.

Figure 3A:
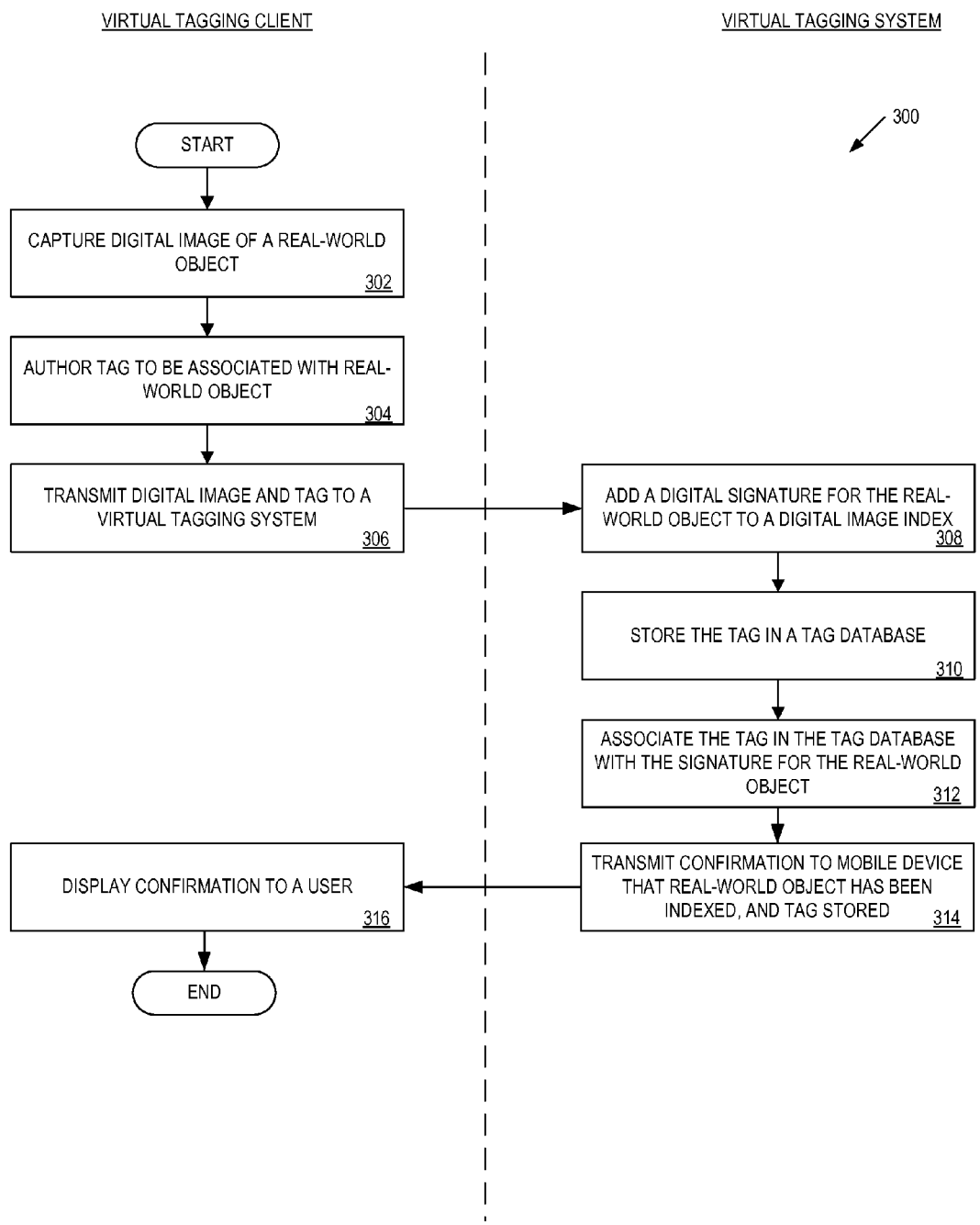
FIG. 3A is a flow diagram of one embodiment of a method for creating a virtual tag for a real-world object in a digital image.

FIG. 3A is a flow diagram of one embodiment of a method 300 for creating a virtual tag for a real-world object in a digital image. The method 300 is performed by processing logic that may comprise hardware (circuitry, dedicated logic, etc.), software (such as is run on a general purpose computer system or a dedicated machine), firmware, or a combination. In one embodiment, the method 300 is performed by a virtual tagging client and a virtual tagging system (e.g., virtual tagging client 112 or 212, and virtual tagging system 132 or 232).

Referring to FIG. 3A, processing logic begins by capturing a digital image of a real-world object (processing block 302). In one embodiment, a mobile device, such as a cellular telephone, tablet computer, wearable processing system, etc., captures the digital image with a camera of the mobile device. The digital image may be a still digital image, video, live video feed, etc. In one embodiment, the real-world object may be any object such as landmarks (e.g., the Eiffel Tower), artwork, buildings, corporate logos, movie posters, physical locations, etc.

Processing logic authors a virtual tag that is to be associated with the real world object in the captured digital image (processing block 304). In one embodiment, processing logic receives user-created content for the virtual tag. In one embodiment, the user-created content may include one or more comments about a real world object, pictures taken by the user of the real-world object, videos, instructions relevant to the real-world object (e.g., a picture of a coffee pot tagged with instructions on how to use the coffee pot), reviews of the real world object, web links, user selection of a pre-created tag or virtual sticker, GPS data, etc. The authoring of virtual tags and a more detailed discussion of the various types of virtual tags that may be utilized as discussed herein is provided below in FIG. 4.

Processing logic transmits the digital image and the virtual tag, authored by a user of the mobile device, to a virtual tagging system (processing block 306). In one embodiment, processing logic then adds a digital signature for the real-world object to a digital image index (processing block 308). In one embodiment, processing logic of the virtual tagging client computes the image signature on a mobile device. In this embodiment, the virtual tagging client transmits the image signature, and not the corresponding image, to the virtual tagging system. Transmission of the digital signature, and not the image itself, consumes less bandwidth when transmitted, and thus can be uploaded faster by the virtual tagging system. In one embodiment, an intermediate form of the image, such as a low resolution preview, could also be transmitted with the digital signature. In yet another embodiment, both the virtual tagging client and the virtual tagging system generate digital signatures for the real-world object.

In either embodiment discussed above, the digital signature is a feature vector extracted from the digital image of the real-world object and provides a unique identification of the real-world object. In one embodiment, processing logic inserts the digital signature into the digital image index in real-time, without waiting for a batch update of the digital image index. Because the digital signature is added to the image index in real-time, the real world object captured by the mobile device becomes immediately searchable via the digital image index by other users.

Processing logic stores the tag in a tag database (processing block 310). In one embodiment, when the tag is stored in the tag database, processing logic further associates the tag in the tag database with the signature for the real-world object (processing block 312). In one embodiment, this association enables other users who capture digital images of the real world object to both, have the real-world object located in the digital image index and find the virtual tag data associated with the digital signature. As discussed below in FIG. 3B, other users may view the virtual tags in digital images captured by their mobile devices.

Processing logic transmits a confirmation to the mobile device that the real-world object was successfully indexed, and the corresponding virtual tag stored (processing block 314). In one embodiment, the confirmation provides acknowledgement to the user that the real-world object is instantly searchable by other users, and that their authored virtual tags may be viewed by other users. Processing logic displays the confirmation to the user (processing block 316). In one embodiment, the confirmation may be a popup message in a tag authoring user interface, an email confirmation message, a text confirmation, etc. In another embodiment, the confirmation may also include a non-visual confirmation such as an audio confirmation (e.g., a beep, ringtone, etc.) or a physical confirmation (e.g., the mobile device vibrating).

Figure 3B:
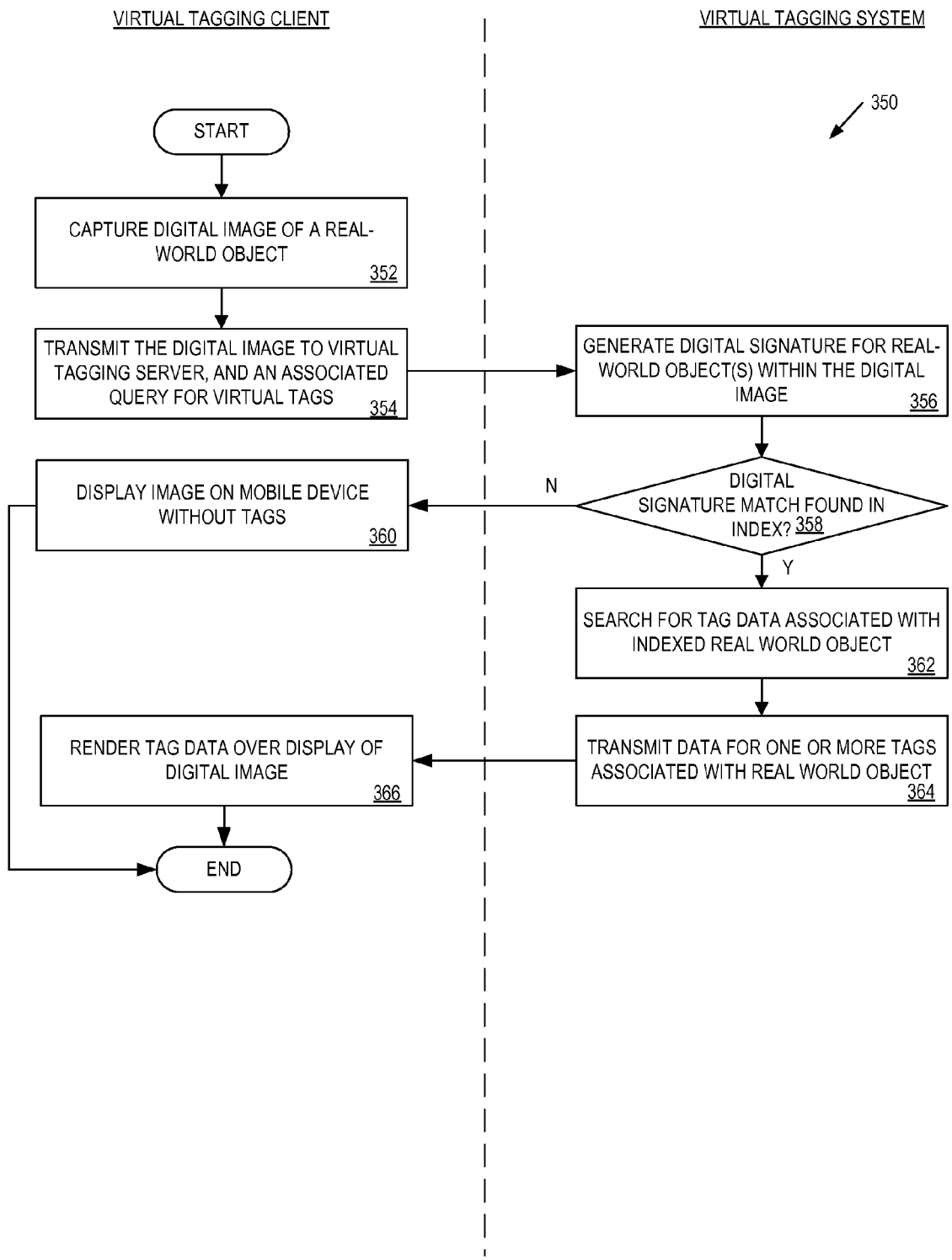
FIG. 3B is a flow diagram of one embodiment of a method for viewing a virtual tag associated with a real-world object captured in a digital image.

FIG. 3B is a flow diagram of one embodiment of a method 350 for viewing a virtual tag associated with a real-world object captured in a digital image. The method 350 is performed by processing logic that may comprise hardware (circuitry, dedicated logic, etc.), software (such as is run on a general purpose computer system or a dedicated machine), firmware, or a combination. In one embodiment, the method 400 is performed by a virtual tagging client and a virtual tagging system (e.g., virtual tagging client 112 or 212, and virtual tagging system 132 or 232).

Referring to FIG. 3B, processing logic begins by capturing a digital image of a real-world object (processing block 352). As discussed above, a mobile device, such as a cellular telephone, tablet computer, wearable processing system, etc., captures the digital image with a camera of the mobile device. Processing logic transmits the digital image, and an associated query for virtual tags, to a virtual tagging system (processing block 354). In one embodiment, the query may be a user initiated query to determine whether there are virtual tags for real-world object in an image, video, or video feed. In another embodiment, the query is generated automatically by processing logic to provide users with virtual tags without receiving user requests. In this embodiment, a user who captures a digital image, video, or is viewing a live video feed, would automatically be presented with tag data or notice that tag data is available, as discussed below. As discussed above, in one embodiment, processing logic of the virtual tagging client may compute an image signature for the captured digital image of the real-world object. In this embodiment, the virtual tagging client transmits the image signature, and not the corresponding image, to the virtual tagging system.

Processing logic generates a digital signature for the real-world object, or objects, within the digital image (processing block 356). However, in the embodiment discussed above, processing logic receives a digital signature from the virtual tagging client and does not need to generate the digital signature. Processing logic utilizes the digital signature(s) to search an index of digital images (processing block 358). When there is not match within the index for the real-world object(s), processing logic displays the digital image on the mobile device without rendering tag data over the digital image (processing block 360). However, when a match is found in the digital image index, processing logic searches for virtual tag data associated with the image of the indexed real-world object (processing block 362). The tag data, for one or more tags associated with a real-world object, is then transmitted to the virtual tagging client (processing block 364).

Processing logic renders the tag data over a display of the digital image (processing block 366). In one embodiment, processing logic renders text, virtual stickers, web links, photos, videos, etc. over the display of the digital image. In one embodiment, where the digital image is a video or live video feed, the real-world object that is tagged is tracked within the video. Based on the tracking data, processing logic updates the rendering location of the tag data within the video so that the tag data is displayed in the appropriate location of the video with respect to the location of the real-world object within the video.

FIG. 12 illustrates an exemplary display of a digital image with virtual tags rendered over the digital image. In the exemplary display, mobile device 1200 has captured a digital image of a movie poster 1206. As discussed above in FIG. 3B, the image of the movie poster would be searched in a digital image index. If a match is found, virtual tags, such as virtual sticker tags 1202 and 1204, are rendered over the digital image of the movie poster. Thus, the user who captured the image of the poster can view previous user comments about the movie, user impressions of the movie as indicated by the virtual sticker tags 1202 and 1204, etc.

Figure 4:
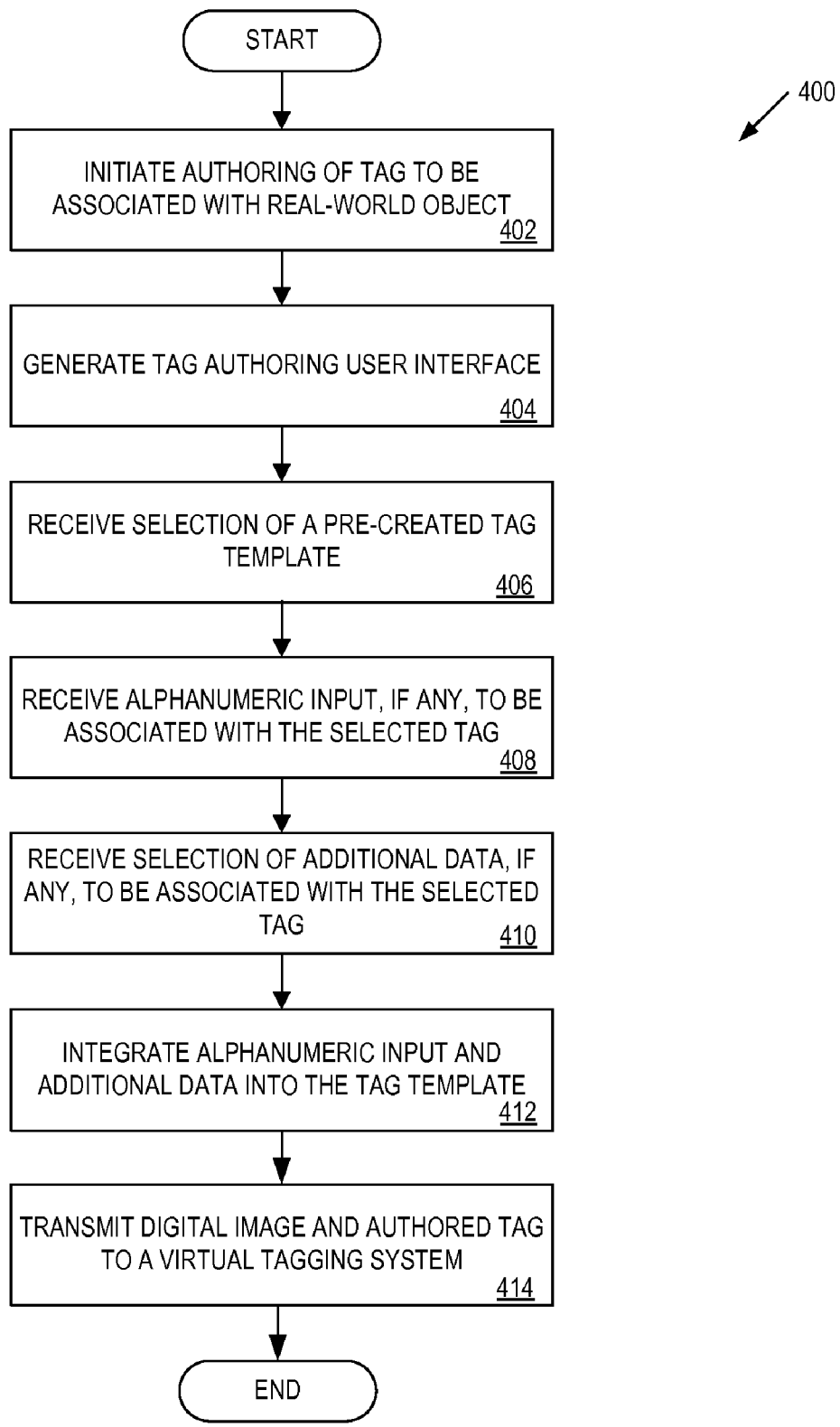
FIG. 4 is a flow diagram of one embodiment of a method for authoring a virtual tag to be associated with a real-world object.

FIG. 4 is a flow diagram of one embodiment of a method 400 for authoring a virtual tag to be associated with a real-world object. The method 400 is performed by processing logic that may comprise hardware (circuitry, dedicated logic, etc.), software (such as is run on a general purpose computer system or a dedicated machine), firmware, or a combination. In one embodiment, the method 400 is performed by a virtual tagging client (e.g., virtual tagging client 112 or 212).

Figure 13:
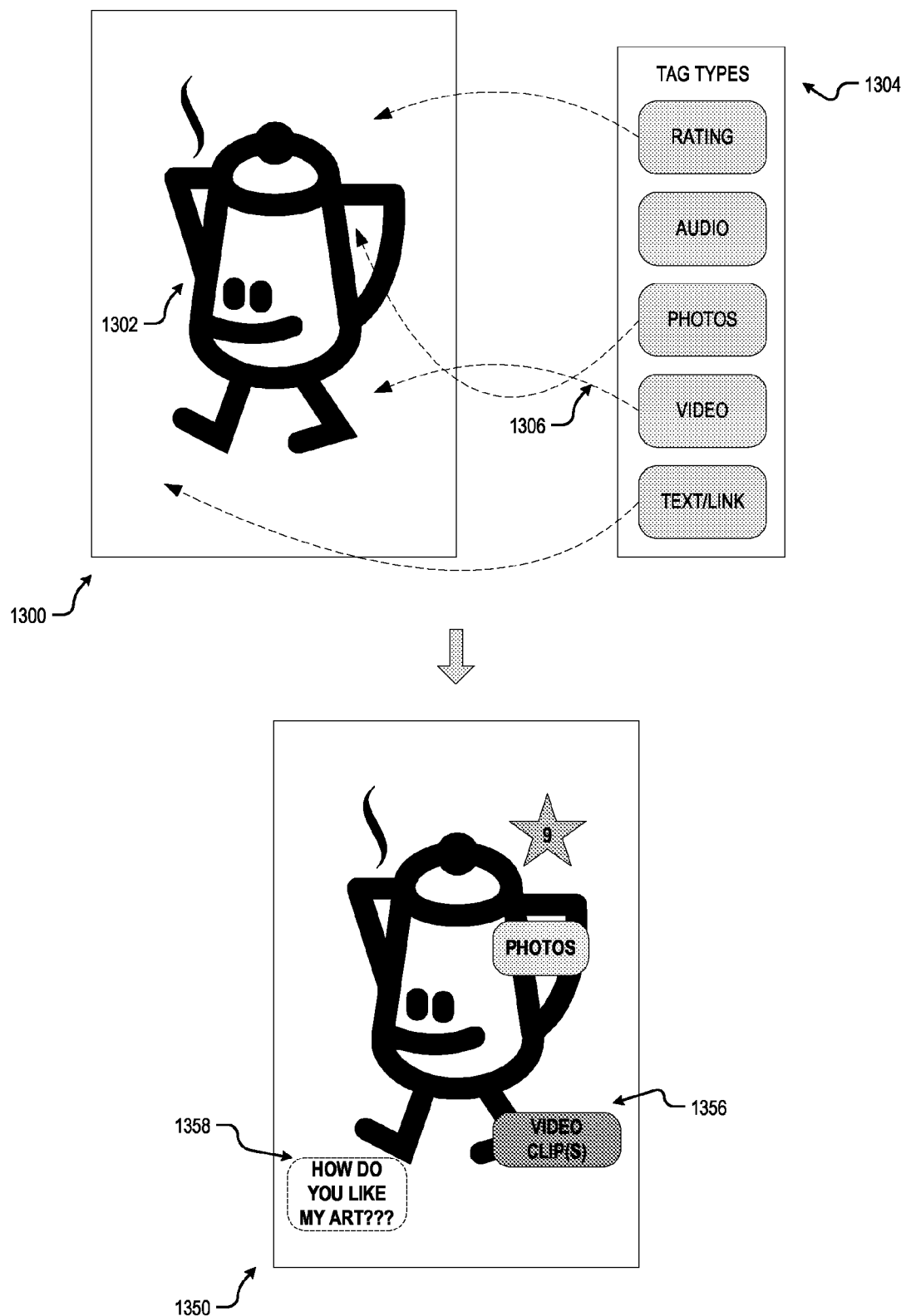
FIG. 13 illustrates the addition of virtual tags to a digital image.

Referring to FIG. 4, processing logic begins by initiating the authoring of a tag to be associated with a real-world object (processing block 402). In one embodiment, the authoring of a virtual tag is initiated by processing logic whenever a digital image is captured. In another embodiment, authoring of virtual tags is initiated in response to a user request to author a virtual tag. Processing logic then generates a tag authoring user interface (processing block 404). FIG. 13 illustrates an exemplary tag authoring interface 1304 for a digital image of street art 1302.

Processing logic receives a selection of a pre-created tag template (processing block 406). In one embodiment, tag templates are provided to a user who is authoring a tag so that the user may simply select a template and fill in relevant data for the virtual tag into the template. Processing logic receives alphanumeric input, if any, to be associated with the selected tag (processing block 408). In one embodiment, the alphanumeric input may include comments about a real-world object or place, instructions, information, etc. In one embodiment, additional forms of user input may be received by processing logic for association with a selected tag. For example, spoken input may be received, which may or may not be transcribed into text for a tag. Furthermore, the spoken input may be received as an audio file for a tag.

Processing logic also receives additional data, if any, to be associated with the selected tag (processing block 410). The additional data may be web links, user photos, video, etc. The additional data may also include data that limits the visibility of tags to specific users. For example, the additional data may specify that only members of a user's social networking circle of friends may view a virtual tag.

Processing logic integrates the alphanumeric input and the additional data into the tag template (processing block 412) and transmits the authored tag to a virtual tagging system (processing block 414). Thus, a user is enabled to select a tag template, enter relevant data, and submit the tag in an efficient and intuitive process. As discussed above, FIG. 13 illustrates street art 1302 displayed 1300 in a mobile device. A user may select various tag types 1304 to be associated 1306 with street art 1302. When another user views the street art 1350 with a mobile device, they are presented with the tags (e.g., tag 1356) associated with the real-world art object 1302.

The tag templates discussed above enable virtual tag authoring to cover many different scenarios with different templates for corresponding tag types. One type of tag that may be authored by a user is an information tag. Any interesting object, work of art, etc. can have an "information tag." For example, a coffee machine can have a tag with "information about how to make coffee", a painting/work of art can have information provided by the artist, where the owner acquired the painting, their personal feeling about the painting, etc. Furthermore, a user can create a Wikipedia™-style page about a real-world object, that can be added to by others via future virtual tagging of the real-world object.

A social interaction tag for a real-world object or location may also be authored by a user. In one embodiment, a user could leave "like", "check-in", "comments", and other social networking information in virtual tags. This has some analogy with a "place page" in Google Maps™ or a FourSquare™ page about a business. However, the virtual tags can work for any location or object. In fact, all Place pages from Google Maps™ can be shown for all businesses that have them.

Virtual tags can also be used as virtual bulletin boards. For example, a bulletin board tag can represent a guest book for a location, business, place, etc. The bulletin board tag may also be similar to a Facebook™ wall for a location, business, place, etc. The bulletin board tag is not limited to text entries, as various types of objects could be made visible when painted/rendered over a real-world object, such as photos, videos, web links, etc.

Photo virtual tags may also be used. For example, photos of a real-world place or object can represent a historical record of the place or object. Photos posted to a real-world place may also include photos of exciting events that happened nearby, including unusual events (e.g., fairs, parades, fires, etc.) and some memorable personalities that are typically found in these places (e.g., the hippie next door, San Francisco Tree Man, etc.).

Similar to photo virtual tags, video virtual tags may also be associated with real world object. For example, users can film themselves at a particular place and associate a video with that place. In one embodiment, the first frames of the video show the object/place that is tagged, and then the remainder of the video can transition to another video (e.g., a family video, video taken nearby, video commentary about the place, etc.).

In one embodiment, virtual tags may also provide interactive experiences. One such tag is a challenge virtual tag. With challenge virtual tags applied to real-world objects, a challenge could be posted to other users to do something silly or impressive at a given place. Then, other users can associate photos or videos of themselves doing the challenge at the place. Alternatively, their achievements can be added to a leader-board of the virtual challenge tag.

Another interactive virtual tag is a treasure hunt tag. Treasure hunt tags can provide a series of hints to enable users to find other treasure hunt tags, and ultimately to win a prize. Participants of a treasure hunt would also be able to leave tags about the treasure hunt at non-treasure hunt locations.

Yet another form of virtual tag is the coupon or product tag. In one embodiment, coupons may be used to tag real-world objects. Thus, users with mobile devices that support a virtual tagging client would be able to receive discounts in the form of virtual tags. The coupon tags could be placed over objects, storefronts, services, etc., and promotional videos about the object, service, store, etc., are displayable via the coupon tags. In one embodiment, the coupon tags may then be redeemable when a user purchases an object, shops at a store, contracts for a service, etc. Furthermore, with the addition of GPS data, the coupon tags can be made location specific.

Tags may also aid in social networking. For example, a social networking tag could be applied to people via face recognition. For a given user, recognized faces in digital images or video could be checked against a social networking account and social networking virtual tags rendered next to the recognized faces. In one embodiment, the tags can show their latest status, provide links to their recent photos, or information on who their friends are (e.g., to enable a conversation such as "I see you know ABC, well I also know them from college . . . ").

Furthermore, virtual tags may also represent virtual objects that can be added to real-world scenes. In one embodiment, two-dimensional (e.g., planar) virtual graffiti can be added to real-world object or places. For example, virtual artwork can be placed on the side of a building, on walls or on objects. Virtual objects can also be utilized to leave virtual messages for other users on real-world objects or places. For example, a virtual object associated with a person's house could be a sign painted over the front door of the house that reads "Welcome Home!"

In another embodiment, the virtual object can be a three-dimensional object. For example, a virtual bouquet of flowers could be placed on a loved one's table. As another example, mythical/mystical creatures, statues, etc. can be used to tag a boring place in order to make it more interesting. In this embodiment, when the three-dimensional virtual object is associated with an object or a scene in the real world, it is rendered on a mobile device screen in a position and orientation that is consistent with its real-world context. This position and orientation can be estimated on the mobile device using either the mobile device's sensors, or through matching against reference data (images, scene geometry and other sensor information) that describes the scene.

In yet another embodiment, the virtual object can be a three-dimensional animated object. For example, a three-dimensional animated snake may guard a coffee machine, a monkey hanging out near a refrigerator, aliens running across a public square, virtual party decorations (e.g., fire breathing dragons in one room, huge droplets of rain in another), etc.

In the embodiments of virtual objects discussed above, the virtual objects tagged to real-world objects or places help to extend a familiar context with unexpected and unfamiliar elements. Panning a camera of a phone or a wearable computing device around a place enables the virtual reality provided by the virtual objects to merge with the real world environment.

In one embodiment, location-aware photo/video sharing may also be enabled via virtual tagging. In one embodiment, virtual tags for photos or videos can be associated with particular locations and particular objects. In one embodiment, the photo or videos can be shared with a user's social circle, or with everyone that captures a digital image of the particular place or object. In one embodiment, a virtual tagging system can provide all photos of social networking friends that were captured nearby (e.g., in the same city, city block, same building, same room, etc.). Like many social networking threads, the photos would enable a user to see their friends doing cool or embarrassing things, being in cool or embarrassing places, etc.

In one embodiment, the virtual tagging system enables location-aware photo/video sharing for exciting events that happen nearby. For example, a user capturing video at a city square, tourist location, landmark, etc. could be provided photos and/or videos from a nearby bar with an active nightlife. In one embodiment, the location-aware photos and videos can be provided by a virtual tagging system along a timeline (e.g. older to newer).

Figure 5:
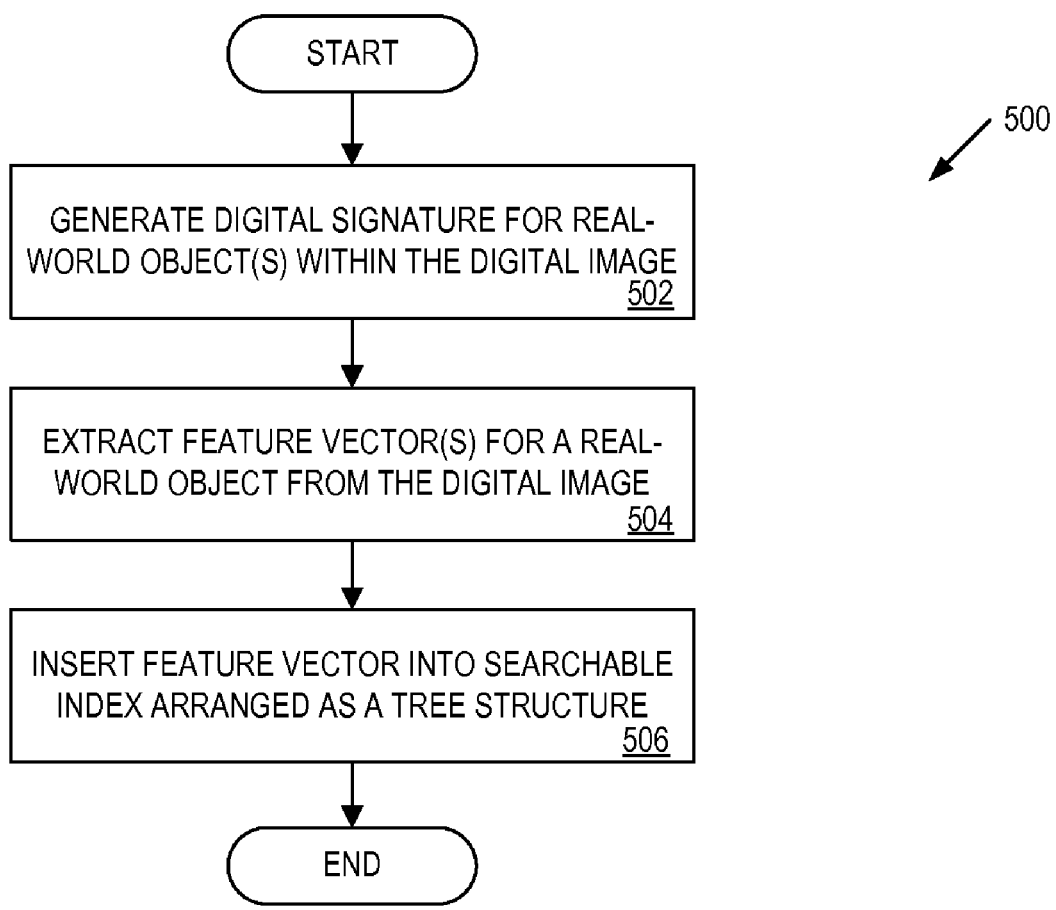
FIG. 5 is a flow diagram of one embodiment of a method for inserting an image of a real-world object into a digital image index in real time.

FIG. 5 is a flow diagram of one embodiment of a method 500 for inserting an image of a real-world object into a digital image index in real time. The method 500 is performed by processing logic that may comprise hardware (circuitry, dedicated logic, etc.), software (such as is run on a general purpose computer system or a dedicated machine), firmware, or a combination. In one embodiment, the method 500 is performed by a virtual tagging system (e.g., virtual tagging system 132 or 232).

Referring to FIG. 5, processing logic begins by generating a digital signature for one or more real world objects within a digital image (processing block 502). As discussed above, a digital image, video, or video feed is captured by a mobile device. Processing logic receives the image/video data from the mobile device in order to add real world objects to the digital image index.

Processing logic extracts one or more feature vectors for a real-world object from the digital image (processing block 504). In one embodiment, the digital signature is made of the one or more feature vectors extracted from the digital image of the real world object. The feature vector describes an image based on interest points within the image. In one embodiment, the interest points that are selected for the feature vector describe the real world object such that they can be reliably found again in other digital images or videos of the real-world object. For example, the interest points can be corners, blobs, changes in contrast, or other high gradient points, as opposed to continuous tone regions of an image of the real-world object. In one embodiment, these points are utilized to create the feature vector to describe the pixels around the points of the image. The image of the real-world object, and thus the real-world object, is characterized by the one or more feature vectors.

Processing logic inserts the one or more feature vectors into a searchable index arranged as a tree structure (processing block 506). In one embodiment, the tree-structure-based index allows a nearest neighbor search of feature vectors in the index. In one embodiment, the tree is a k-dimensional (KD) tree. In one embodiment, the feature vectors are inserted into the tree tree-structure-based index in real-time in response to feature vectors being extracted from the digital image. As opposed to a batch index update process, the digital image of the real-world object is indexed by processing logic in real time. As a result, images that contain the real-world object are immediately searchable via the index such that the search will return a matching result for the real-world object.

Figure 6:
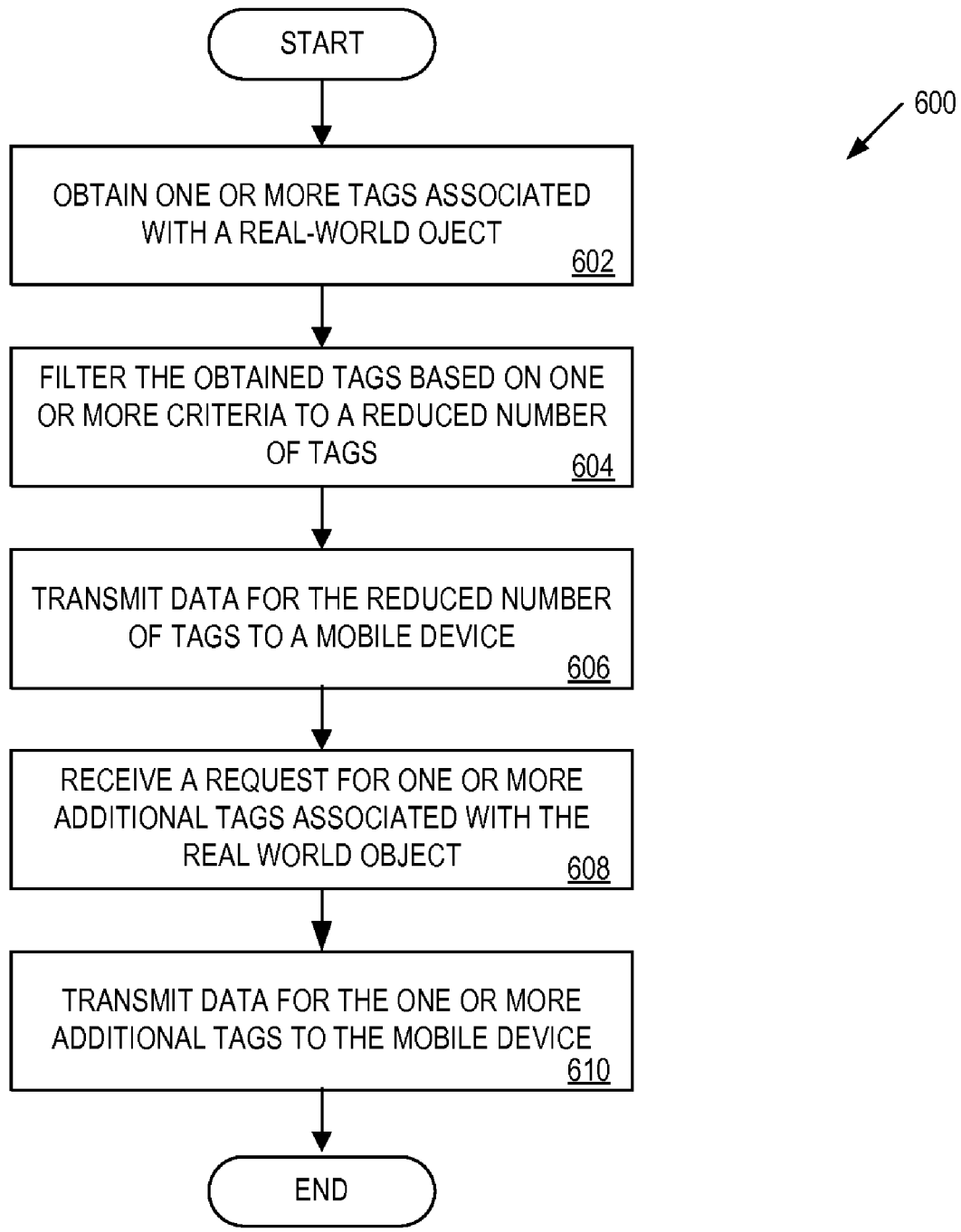
FIG. 6 is a flow diagram of one embodiment of a method for filtering virtual tags located for a real world object.

FIG. 6 is a flow diagram of one embodiment of a method 600 for filtering virtual tags located for a real world object. The method 600 is performed by processing logic that may comprise hardware (circuitry, dedicated logic, etc.), software (such as is run on a general purpose computer system or a dedicated machine), firmware, or a combination. In one embodiment, the method 600 is performed by a virtual tagging system (e.g., virtual tagging system 132 or 232).

Referring to FIG. 6, processing logic begins by obtaining one or more tags associated with a real-world object (processing block 602). In accordance with the discussion herein, an image of a real-world object is utilized to match previously captured images utilizing image recognition and a search of a digital image index. When a match is found, processing logic utilizes the match to obtain the one or more tags from a tag database.

Processing logic filters the obtained tags based on one or more criteria to a reduced number of tags (processing block 604). As discussed above, there are numerous virtual tag scenarios and associated types of tags. For example, a large number of photo tags could be associated with a popular neighborhood bar. The amount of photos could overwhelm a user that is viewing the tags, or the sheer number of tags could render the information useless. Thus, in one embodiment, processing logic applies a filter to reduce the data returned to the user. For example, only photo tags associated with the neighborhood bar from the past day, week, month, etc. may be initially presented to a user. As another example, only photo tags created by "friends" of the user in a social networking system may be initially presented to the user. In one embodiment, the one or more filtering criteria may be set by the user that is currently obtaining the virtual tags, may be set based on a type of tag, may be set by the original tagger for a real-world object, etc. In one embodiment, the filtering criteria may also be extracted from tag data. For example, a group of tags could be collapsed into clusters or bundles based on an explicit rating in a group of tags, or by sentiment, ratings, etc. extracted from text in the group of tags. The reduced number of tags are then transmitted to the mobile device capturing the image of the real-world object (processing block 606).

Processing logic receives a request for one or more additional tags associated with the real-world object (processing block 608). In response to the request, processing logic transmits the data for the one or more additional tags to the mobile device (processing block 610). In one embodiment, processing logic provides additional tags to a user when the user would like more information, photos, videos, etc. for a real-world object. This allows a user to decide how much virtual tag information he or she would like concerning a real-world object.

Figure 7:
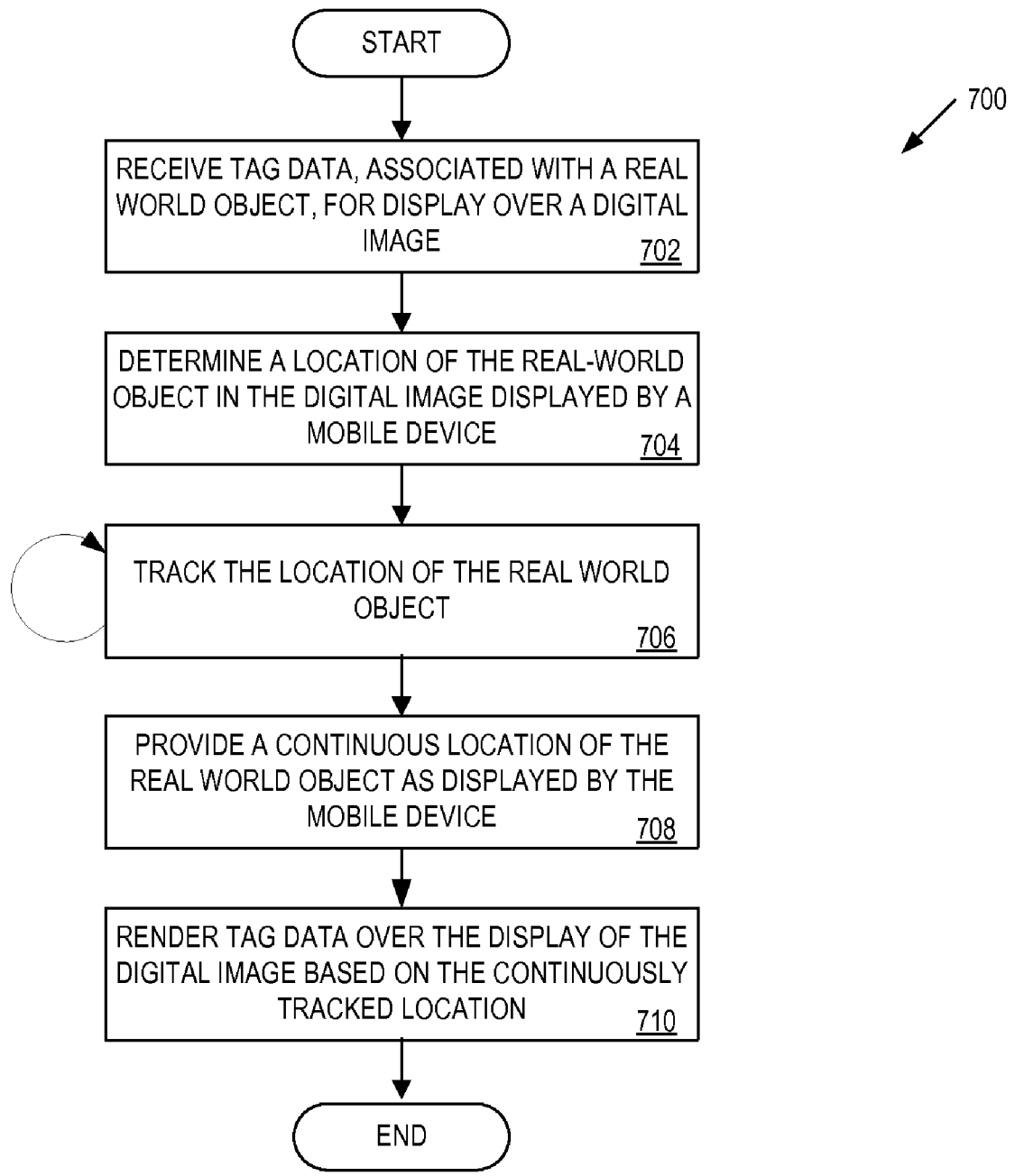
FIG. 7 is a flow diagram of one embodiment of a method for continuously tracking real-world objects in digital images.

FIG. 7 is a flow diagram of one embodiment of a method 700 for continuously tracking real-world objects in digital images. The method 700 is performed by processing logic that may comprise hardware (circuitry, dedicated logic, etc.), software (such as is run on a general purpose computer system or a dedicated machine), firmware, or a combination. In one embodiment, the method 700 is performed by a virtual tagging client (e.g., virtual tagging client 112 or 212).

Referring to FIG. 7, processing logic begins by receiving tag data, associated with a real-world object, for display over a digital image (processing block 702). In one embodiment, a camera of a mobile device has either captured a still image of the real-world object, captured video that contains the real-world object, or is capturing a live video feed that contains the real-world object. When the real-world object is matched in a digital image index, the associate tag data is provided to the mobile device.

Processing logic determines a location of the real-world object in the digital image being displayed by the mobile device (processing block 704). In one embodiment, processing logic locates pixels within the digital image, a bounding box around the real-world object in the digital image, etc. Processing logic may then utilize this location data, as described below, to render virtual tags over a still digital image or video at the appropriate location relative to the real-world object within the image/video.

Based on the selected pixels, bounding box, etc., processing logic tracks the location of the real-world object in the picture or video (processing block 706). Processing logic provides the continuous location of the real-world object in the display of the mobile device to a rendering system (processing block 708). The tag data is then rendered over the digital image displayed by the mobile device based on the continuously tracked location of the real-world object within the image/video (processing block 710). In one embodiment, the continuous tracking of the real-world object within a video enables the location that tag data is displayed in a video to be refreshed relative to a change in location of the real world object within the video. Thus, the tag continuously appears in the correct location, with respect to the corresponding real-world object, within the digital video.

Figure 8:
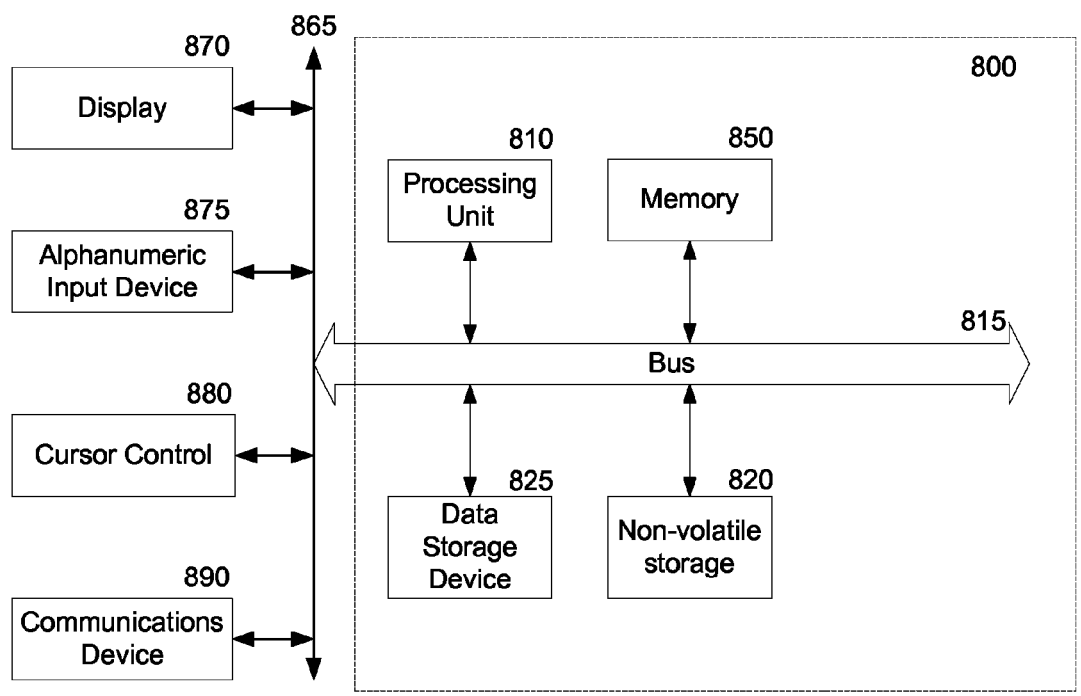
FIG. 8 illustrates a diagrammatic representation of a machine in the exemplary form of a computer system.

FIG. 8 is one embodiment of a computer system that may be used with the present invention. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a cathode ray tube (CRT) or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

Figure 9:
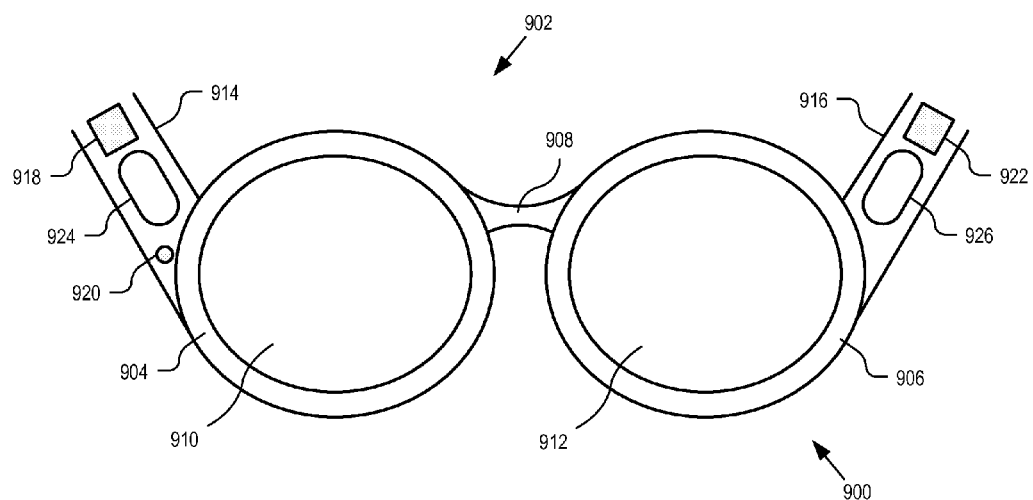
FIG. 9 illustrates an example system for receiving, transmitting, and displaying virtual tags.

FIG. 9 illustrates an example system 900 for receiving, transmitting, and displaying virtual tag data. The system 900 is shown in the form of a wearable computing device. While FIG. 9 illustrates eyeglasses 902 as an example of a wearable computing device, other types of wearable computing devices could additionally or alternatively be used. As illustrated in FIG. 9, the eyeglasses 902 comprise frame elements including lens-frames 904 and 906 and a center frame support 908, lens elements 910 and 912, and extending side-arms 914 and 916. The center frame support 908 and the extending side-arms 914 and 916 are configured to secure the eyeglasses 902 to a user's face via a user's nose and ears, respectively.

Each of the frame elements 904, 906, and 908 and the extending side-arms 914 and 916 may be formed of a solid structure of plastic or metal, or may be formed of a hollow structure of similar material so as to allow wiring and component interconnects to be internally routed through the eyeglasses 902. Each of the lens elements 910 and 912 may be formed of any material that can suitably display a projected image or graphic. Each of the lens elements 910 and 912 may also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side-arms 914 and 916 are each projections that extend away from the frame elements 904 and 906, respectively, and are positioned behind a user's ears to secure the eyeglasses 902 to the user. The extending side-arms 914 and 916 may further secure the eyeglasses 902 to the user by extending around a rear portion of the user's head. Additionally or alternatively, for example, the system 100 may connect to or be affixed within a head-mounted helmet structure. Other possibilities exist as well.

The system 900 may also include an on-board computing system 918, a video camera 920, a sensor 922, and finger-operable touch pads 924, 926. The on-board computing system 918 is shown to be positioned on the extending side-arm 914 of the eyeglasses 902; however, the on-board computing system 918 may be provided on other parts of the eyeglasses 902. The on-board computing system 918 may include a processor and memory, for example. The on-board computing system 918 may be configured to receive and analyze data from the video camera 920 and the finger-operable touch pads 924, 926 (and possibly from other sensory devices, user interfaces, or both) and generate images for output from the lens elements 910 and 912. The video camera 920 is shown to be positioned on the extending side-arm 914 of the eyeglasses 902; however, the video camera 920 may be provided on other parts of the eyeglasses 902. The video camera 920 may be configured to capture images at various resolutions or at different frame rates. Many video cameras with a small form-factor, such as those used in cell phones or webcams, for example, may be incorporated into an example of the system 900. Although FIG. 9 illustrates one video camera 920, more video cameras may be used, and each may be configured to capture the same view, or to capture different views. For example, the video camera 920 may be forward facing to capture at least a portion of the real-world view perceived by the user. This forward facing image captured by the video camera 920 may then be used to generate an augmented reality where computer generated images appear to interact with the real-world view perceived by the user.

The sensor 922 is shown mounted on the extending side-arm 916 of the eyeglasses 902; however, the sensor 922 may be provided on other parts of the eyeglasses 902. The sensor 922 may include one or more of a gyroscope or an accelerometer, for example. Other sensing devices may be included within the sensor 922 or other sensing functions may be performed by the sensor 922. The finger-operable touch pads 924, 926 are shown mounted on the extending side-arms 914, 916 of the eyeglasses 902. Each of finger-operable touch pads 924, 926 may be used by a user to input commands. The finger-operable touch pads 924, 926 may sense at least one of a position and a movement of a finger via capacitive sensing, resistance sensing, or a surface acoustic wave process, among other possibilities. The finger-operable touch pads 924, 926 may be capable of sensing finger movement in a direction parallel or planar to the pad surface, in a direction normal to the pad surface, or both, and may also be capable of sensing a level of pressure applied. The finger-operable touch pads 924, 926 may be formed of one or more translucent or transparent insulating layers and one or more translucent or transparent conducting layers. Edges of the finger-operable touch pads 924, 926 may be formed to have a raised, indented, or roughened surface, so as to provide tactile feedback to a user when the user's finger reaches the edge of the finger-operable touch pads 924, 926. Each of the finger-operable touch pads 924, 926 may be operated independently, and may provide a different function.

Figure 10:
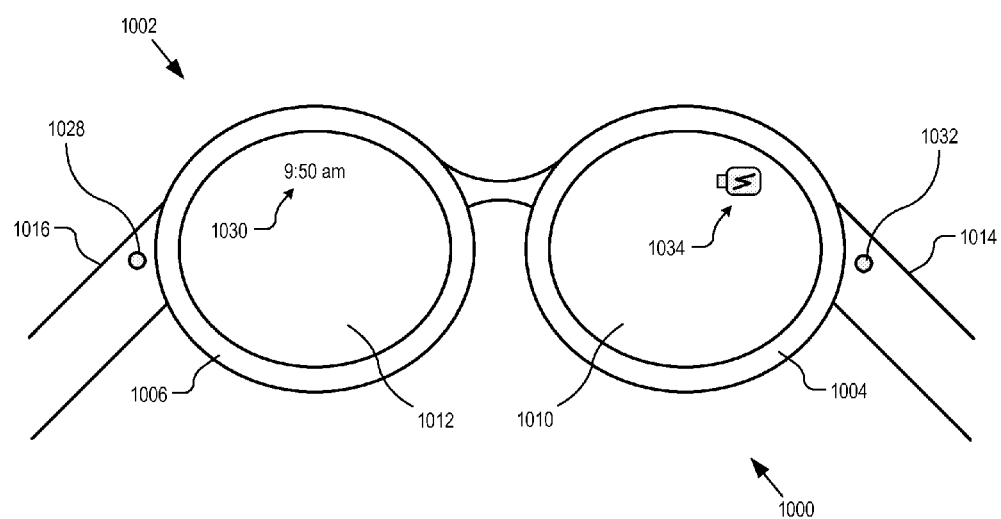
FIG. 10 illustrates an alternate view of an example system for receiving, transmitting, and displaying virtual tags.

FIG. 10 illustrates an alternate view 1000 of the system 900 of FIG. 9. As shown in FIG. 10, the lens elements 1010 and 1012 may act as display elements. The eyeglasses 1002 may include a first projector 1028 coupled to an inside surface of the extending side-arm 1016 and configured to project a display 1030 onto an inside surface of the lens element 1012.

Additionally or alternatively, a second projector 1032 may be coupled to an inside surface of the extending sidearm 1014 and configured to project a display 1034 onto an inside surface of the lens element 1010. The lens elements 1010 and 1012 may act as a combiner in a light projection system and may include a coating that reflects the light projected onto them from the projectors 1028 and 1032.

In some embodiments, a special coating may not be used (e.g., when the projectors 1028 and 1032 are scanning laser devices). In alternative embodiments, other types of display elements may also be used. For example, the lens elements 1010, 1012 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 1004 and 1006 for driving such a matrix display. Alternatively or additionally, a laser or LED source and scanning system could be used to draw a raster display directly onto the retina of one or more of the user's eyes. Other possibilities exist as well.

Figure 11:
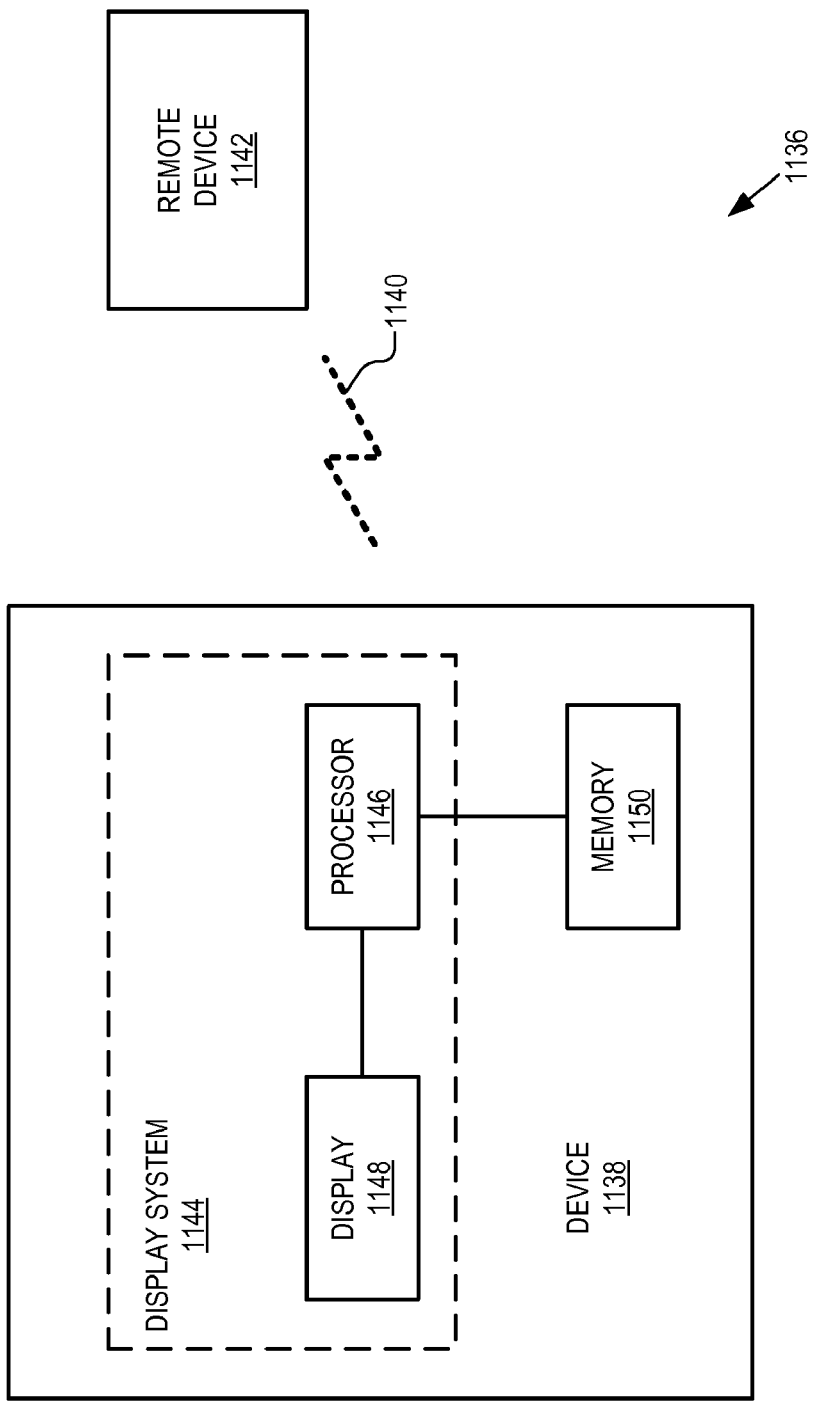
FIG. 11 illustrates an example schematic drawing of a computer network infrastructure.

FIG. 11 illustrates an example schematic drawing of a computer network infrastructure. In one system 1136, a device 1138 communicates using a communication link 1140 (e.g., a wired or wireless connection) to a remote device 1142. The device 1138 may be any type of device that can receive data and display information corresponding to or associated with the data. For example, the device 1138 may be a heads-up display system, such as the eyeglasses 1102 described with reference to FIGS. 9 and 10. Thus, the device 1138 may include a display system 1144 comprising a processor 1146 and a display 1148. The display 1148 may be, for example, an optical see-through display, an optical see-around display, or a video see-through display. The processor 1146 may receive data from the remote device 1142, and configure the data for display on the display 1148. The processor 1146 may be any type of processor, such as a micro-processor or a digital signal processor, for example. The device 1138 may further include on-board data storage, such as memory 1150 coupled to the processor 1146. The memory 1150 may store software that can be accessed and executed by the processor 1146, for example.

The remote device 1142 may be any type of computing device or transmitter including a laptop computer, a mobile telephone, etc., that is configured to transmit data to the device 1138. The remote device 1142 and the device 1138 may contain hardware to enable the communication link 1140, such as processors, transmitters, receivers, antennas, etc.

In FIG. 11, the communication link 1140 is illustrated as a wireless connection; however, wired connections may also be used. For example, the communication link 1140 may be a wired link via a serial bus such as a universal serial bus or a parallel bus. A wired connection may be a proprietary connection as well. The communication link 1140 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 1142 may be accessible via the Internet and may comprise a computing cluster associated with a particular web service (e.g., social-networking, photo sharing, address book, etc.).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A computer-implemented method comprising:
   receiving, at a server computer system, a first digital image data and virtual tag data to be associated with a real-world object in the first digital image data, wherein the first digital image data is captured by a first mobile device, and the virtual tag data includes metadata received from a user of the first mobile device, wherein the virtual tag data received from the user of the first mobile device includes a virtual sticker selected by the user from among a plurality of different virtual stickers, each virtual sticker to convey different information, and the selected virtual sticker to be rendered over digital image data of the real-world object;
   generating a first digital signature from the first digital image data that describes the real-world object, wherein the generated first digital signature comprises a set of feature vectors generated from the first digital image data, each feature vector describing a neighborhood of pixels that surround an interest point for the real-world object in the first digital image data;
   in response to the generation, inserting in substantially real-time the set of feature vectors of the first digital signature into a searchable index of digital images as the set of feature vectors for the first digital image data are generated, the searchable index a searchable k-dimensional tree structure of feature vectors for a plurality of real-world objects;
   storing, in a tag database, the virtual tag data and an association between the virtual tag data and the first digital signature inserted into the index of digital images;
   receiving a second signature generated from a second digital image data captured by a second mobile device, the second digital image data includes one or more real-world objects; and
   transmitting the virtual tag data, received from the user of the first mobile device and associated with the real-world object in the first digital image data, to the second mobile device when a search of the index of digital images based on the second digital signature results in a match with the first digital signature.

2. The method of claim 1, further comprising:
   in response to storage of the virtual tag data in the tag database, transmitting a confirmation to the first mobile device that images of the real-world object are searchable, the confirmation further indicating storage of the virtual tag data was successful.

3. The method of claim 1, further comprising:
   in response to a determination that the second digital signature matches the first digital signature, querying a tag database to locate additional virtual tag data associated with the real-world object;
   obtaining one or more additional tags associated with the real-world object, each of the one or more additional tags includes user-created content; and
   transmitting the additional virtual tag data to the second mobile device.

4. The method of claim 3, further comprising:
   filtering the obtained one or more additional tags prior to transmission of the additional virtual tag data to limit a number of virtual tags that are returned to the mobile device.

5. The method of claim 3, wherein the filtering is performed to limit the virtual tags that are returned to the mobile device to virtual tags created by social networking friends of the user of the mobile device.

6. The method of claim 1, wherein the virtual tag data includes a collection of one or more photographs that are relevant to the real-world object and supplied by the user of the first mobile device.

7. The method of claim 1, wherein the real-world object is a consumer product and the virtual tag data includes a coupon that is redeemable when purchasing the consumer product.

8. The method of claim 1, wherein the first mobile device is a cellular telephone and the second mobile device is a user-wearable computing device in the form of eyeglasses.

9. The method of claim 1, wherein the second digital image data is digital video data captured by the second mobile device and the real-world object is contained within the digital video data.

10. The method of claim 9, wherein the digital video data is a live video feed being captured by the second mobile device, and wherein the virtual tag data is transmitted to the second mobile device to enable the second mobile device to render the virtual tag data over the live video feed.

11. The method of claim 1, further comprising:
    receiving global positioning system (GPS) data from the first mobile device;
    storing an association between the GPS data and the virtual tag data in the tag database that indicates a real-world location where the virtual tag is located; and
    sending a notification to the second mobile device that one or more virtual tags are nearby when the second mobile device is within a predetermined distance of the GPS data associated with the virtual tag data.

12. A non-transitory computer readable storage medium including instructions that, when executed by a processor, cause the processor to perform a method comprising:

receiving, at a server computer system, a first digital image data and virtual tag data to be associated with a real-world object in the first digital image data, wherein the first digital image data is captured by a first mobile device, and the virtual tag data includes metadata received from a user of the first mobile device, wherein the virtual tag data received from the user of the first mobile device includes a virtual sticker selected by the user from among a plurality of different virtual stickers, each virtual sticker to convey different information, and the selected virtual sticker to be rendered over digital image data of the real-world object;

generating a first digital signature from the first digital image data that describes the real-world object, wherein the generated first digital signature comprises a set of feature vectors generated from the first digital image data, each feature vector describing a neighborhood of pixels that surround an interest point for the real-world object in the first digital image data;

in response to the generation, inserting in substantially real-time the set of feature vectors of the first digital signature into a searchable index of digital images as the set of feature vectors for the first digital image data are generated, the searchable index a searchable k-dimensional tree structure of feature vectors for a plurality of real-world objects;

storing, in a tag database, the virtual tag data and an association between the virtual tag data and the first digital signature inserted into the index of digital images;

receiving a second signature generated from a second digital image data captured by a second mobile device, the second digital image data includes one or more real-world objects; and transmitting the virtual tag data, received from the user of the first mobile device and associated with the real-world object in the first digital image data, to the second mobile device when a search of the index of digital images based on the second digital signature results in a match with the first digital signature.

13. The computer readable storage medium of claim 12, in response to a determination that the second digital signature matches the first digital signature, querying a tag database to locate additional virtual tag data associated with the real-world object;

obtaining one or more additional tags associated with the real-world object, each of the one or more additional tags includes user-created content; and transmitting the additional virtual tag data to the second mobile device.

14. The computer readable storage medium of claim 12, wherein the first mobile device is a cellular telephone and the second mobile device is a user-wearable computing device in the form of eyeglasses.

15. A system comprising:

a memory; and a processor coupled with the memory to receive a first digital image data and virtual tag data to be associated with a real-world object in the first digital image data, wherein the first digital image data is captured by a first mobile device, and the virtual tag data includes metadata received from a user of the first mobile device, wherein the virtual tag data received from the user of the first mobile device includes a virtual sticker selected by the user from among a plurality of different virtual stickers, each virtual sticker to convey different information, and the selected virtual sticker to be rendered over digital image data of the real-world object, generate a first digital signature from the first digital image data that describes the real-world object, wherein the generated first digital signature comprises a set of feature vectors generated from the first digital image data, each feature vector describing a neighborhood of pixels that surround an interest point for the real-world object in the first digital image data, in response to the generation, insert in substantially real-time the set of feature vectors of the first digital signature into a searchable index of digital images as the set of feature vectors for the first digital image data are generated, the searchable index a searchable k-dimensional tree structure of feature vectors for a plurality of real-world objects, store, in a tag database, the virtual tag data and an association between the virtual tag data and the first digital signature inserted into the index of digital images, receive a second signature generated from a second digital image data captured by a second mobile device, the second digital image data includes one or more real-world objects, and transmit the virtual tag data, received from the user of the first mobile device and associated with the real-world object in the first digital image data, to the second mobile device when a search of the index of digital images based on the second digital signature results in a match with the first digital signature.

\* \* \* \* \*